(12) United States Patent
Lewis et al.

(10) Patent No.: US 8,143,598 B2
(45) Date of Patent: Mar. 27, 2012

(54) DISPLAY SCREEN COMPRISING PHOTOLUMINESCENT MATERIAL

(75) Inventors: John R. Lewis, Bellevue, WA (US); Kurt A. Jenkins, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 461 days.

(21) Appl. No.: 12/434,428

(22) Filed: May 1, 2009

(65) Prior Publication Data

US 2010/0277890 A1    Nov. 4, 2010

(51) Int. Cl.
*G01N 21/64* (2006.01)
(52) U.S. Cl. .................................. 250/458.1
(58) Field of Classification Search .......... 345/55, 345/58, 156–173; 156/278; 362/84; 250/458.1
See application file for complete search history.

(56) References Cited

U.S. PATENT DOCUMENTS

| | | |
|---|---|---|
| 5,818,361 A | 10/1998 | Acevedo |
| 2008/0018558 A1* | 1/2008 | Kykta et al. ............ 345/58 |
| 2008/0048936 A1* | 2/2008 | Powell et al. ............ 345/55 |

\* cited by examiner

*Primary Examiner* — Kiho Kim
(74) *Attorney, Agent, or Firm* — Alleman Hall McCoy Russell & Tuttle LLP

(57) ABSTRACT

Embodiments are disclosed herein related to the use of photoluminescent material to improve the presentation of images being displayed by a user interface device. For example, one embodiment provides a user interface device including a cuplet microstructure sheet that includes a plurality of cuplets. Each cuplet forms a light input opening and a light output opening. The light output opening has a diameter that is larger than a diameter of the light input opening. The user interface device further includes a photoluminescent material that at least partially fills one or more cuplets of the plurality of cuplets. The user interface device further includes a light source configured to generate light that is directed to one or more selected cuplets of the plurality of cuplets.

20 Claims, 3 Drawing Sheets

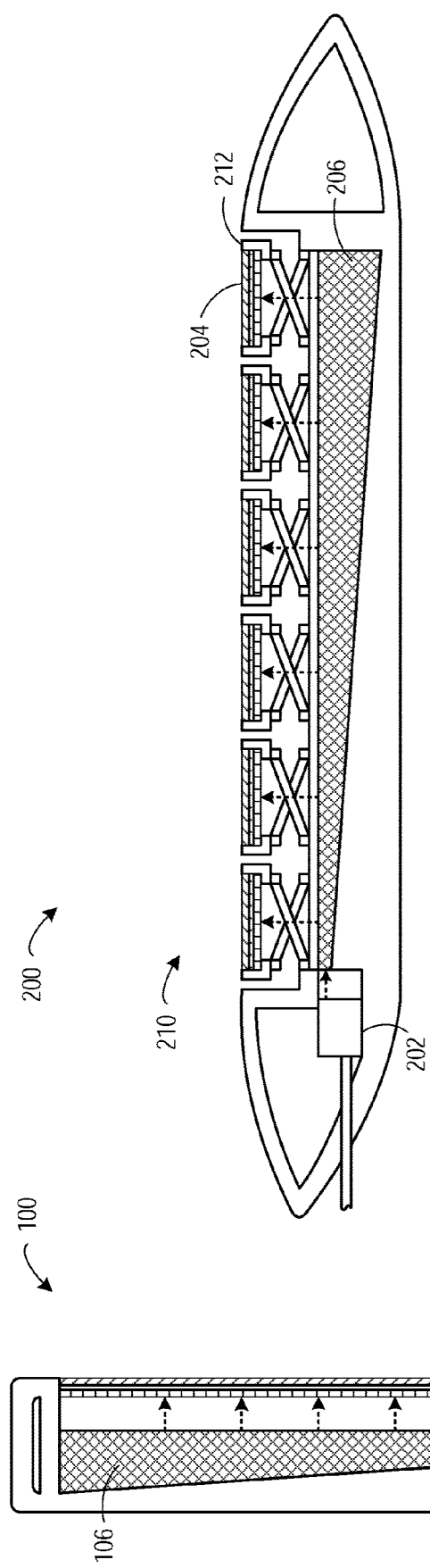

DISPLAY SCREEN COMPRISING PHOTOLUMINESCENT MATERIAL

BACKGROUND

Rear projection display devices may suffer various difficulties with lighting effects that reduce image viewing quality and/or related performance issues. For example, a rear projection image created by a liquid crystal display (LCD) is formed via light subtraction. This may lead to reduced image brightness relative to an emissive display and/or lower power efficiency. Further, ambient light may reduce the contrast of a displayed image. These effects may be at least partially addressed by using a high output light source, such as a scanned beam laser projection device, to form a rear projection image. However, a scanned laser beam may produce speckled images. Further, desired shades of green light may be difficult to produce with current laser technology, which may lead to coloration problems with images displayed by scanned laser projection.

SUMMARY

Accordingly, various embodiments are disclosed herein that relate to the use of photoluminescent material for the presentation of images on a display screen. For example, one embodiment provides a user interface device including a cuplet microstructure sheet that includes a plurality of cuplets. Each cuplet forms a light input opening and a light output opening. The light output opening has a diameter that is larger than a diameter of the light input opening. The user interface device further includes a photoluminescent material that at least partially fills one or more cuplets of the plurality of cuplets. The user interface device further includes a light source configured to generate light that is directed to the light input opening of one or more selected cuplets of the plurality of cuplets.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 1 is a sectional view of an embodiment of a display device that comprises a photoluminescent material.

FIG. 2 is a sectional view of an embodiment of a keyboard that comprises a plurality of keys at least some of which comprise a photoluminescent material.

DETAILED DESCRIPTION

Figure 3:
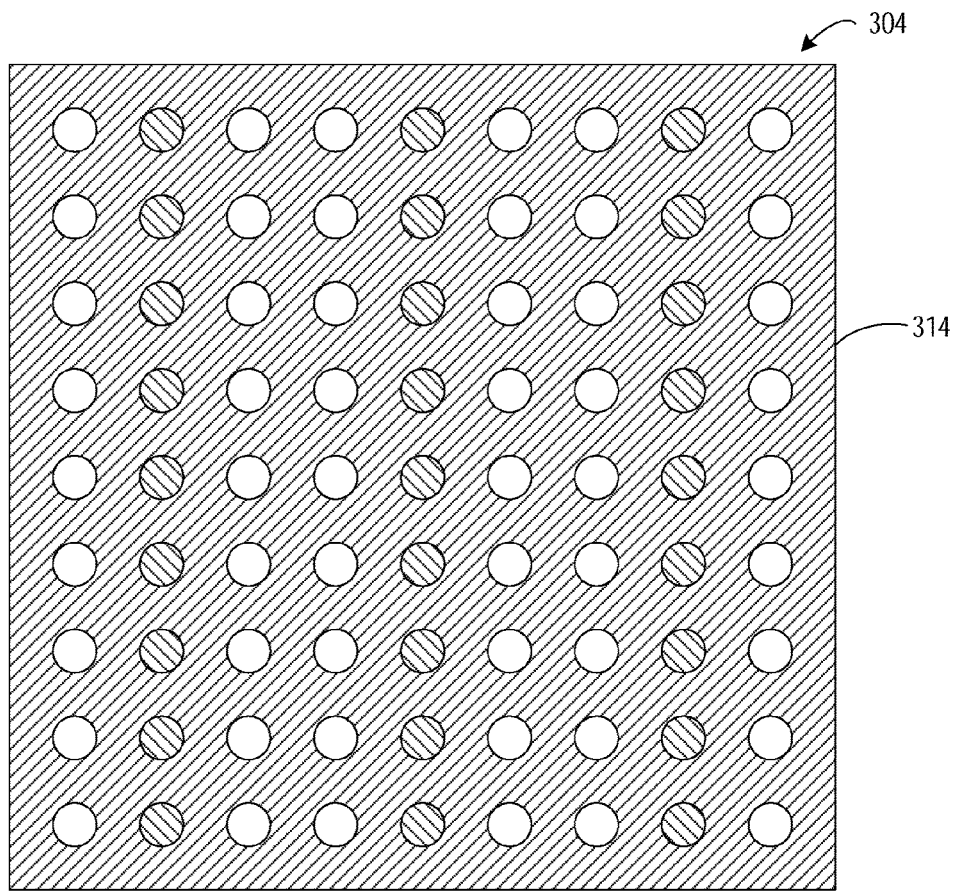
FIG. 3 is a front view of an embodiment of a display screen comprising a cuplet microstructure.

Various embodiments are disclosed that relate to the use of a photoluminescent (PL) material in projection image display. More particularly, various embodiments are disclosed that relate to a display screen comprising a cuplet microstructure in which photoluminescent material is deposited to improve image presentation. For example, the PL material may be strategically deposited in the display screen to adjust a color of light displayed on the display screen compared to a color projected onto the display screen. As another example, the PL material may absorb coherent light and emit incoherent light, which may reduce or eliminate speckle in images created by a scanned beam laser projection device. As yet another example, the display screen may be configured to absorb ambient light in order to improve the contrast of images presented by the display screen.

FIG. 1 schematically shows a sectional view of an embodiment of a user interface device 100 in the form of a display device. The user interface device 100 may be a dynamic rear-projection user interface device in which images are dynamically generated from light produced by a light source 102. The light produced by light source 102 may be directed to a display screen 104 via a light delivery system 106.

Light source 102 may comprise a lamp, a light emitting diode, a laser projection device, etc. In some embodiments, light source 102 may be in the form of a scanned beam laser projection device. The scanned beam laser projection device may comprise one or more laser diodes that may create an image for display on display screen 104 by scanning pixel by pixel while modulating the laser beam(s). A scanned beam laser projection device need not emit light other than when illuminating a pixel. Further, the brightness, and therefore power level, of a laser may be reduced when illuminating dimmer pixels of an image, when projecting various mixes of colors, etc. Accordingly, the scanned beam laser projection device may produce images in a power efficient manner relative to LCDs and other subtractive image-producing elements.

In some embodiments, a scanned beam laser projection device may comprise a plurality of different colored laser diodes that may be cooperatively converted to generate multi-colored images according to the red, green, blue (RGB) color model. Red laser diodes (providing light having a wavelength in a range between 620-750 nm) and blue laser diodes (providing light having a wavelength in a range between 440-495 nanometers) having temporal modulation bandwidths of one gigahertz, as commonly used in laser projection, may be relatively inexpensive and readily available. However, green laser diodes having similar bandwidths may be more complex, less powerful, more expensive, therefore less readily available.

Accordingly, to produce green light, a laser diode configured to emit light of a shorter wavelength than green may be used in conjunction with a display screen 104 having a photoluminescent material configured to absorb the shorter wavelength light and, in response, emit green light (e.g., light having a wavelength in a range between 495-570 nanometers) for display. For example, in one embodiment, a violet laser diode configured to emit light having a wavelength in a range of 380-440 nanometers may be used as a light source to excite a green photoluminescent material. Such violet laser diodes may be relatively inexpensive compared to green laser diodes, and also may be readily available, as such violet laser diodes may be mass produced for use in optical storage devices. In this manner, full RGB color may be displayed via a multi-colored scanned beam laser projection device that comprises a blue laser diode to provide blue light, a red laser diode to provide red light, and a violet laser diode (or other suitable color with a higher energy than green light) that may be directed through PL material on display screen 104 to provide green light. Display screens comprising PL material(s) are discussed in more detail below.

Continuing with FIG. 1, the light delivery system 106 may be positioned optically between light source 102 and display screen 104. The light delivery system 106 may be configured to deliver light produced by light source 102 to display screen 104. In some embodiments, light delivery system 106 may take the form of a light guide or optical wedge. The light guide may direct light provided by light source 102 via total internal reflection to display screen 104.

FIG. 2 shows another example of a projection display device that may utilize a display screen comprising a photoluminescent material. Specifically, FIG. 2 shows a sectional view of an embodiment of a user interface device 200 in the form of an interactive keyboard. The user interface device 200 comprises a keypad 210 comprising a plurality of keys, one of which is indicated at 212. The user interface device 200 additionally comprises a light source 202 configured to selectively display images on a display screen 204 disposed in each key 212 via light delivery system 206. In some embodiments, light delivery system 206 may take the form of a light guide configured to direct light provided by light source 202 via total internal reflection to display screen 204. In this manner, images displayed on key 212 may be modified to adapt to specific use environments, for example, to provide information about specific controls linked to each keyboard key in specific use environments. For example, symbols, letters, numbers, etc. of a specific language in use may be projected onto one or more of keys 212. As another example, computer application-specific control commands may be displayed on one or more of keys 212, as well as any other suitable image.

FIG. 3 shows a front view of an embodiment of a display screen 304. The display screen 304 may be representative of a section of a display screen of a display device, as shown in FIG. 1, and/or may be representative of a section of a display screen disposed in a key of an interactive keyboard, as shown in FIG. 2. The depicted display screen 304 comprises a cuplet microstructure with a plurality of cuplets (e.g. small cup structures), at least some of which may be at least partially filled with a PL material to convert light from one color light to a different color light. In the illustrated embodiment, the plurality of cuplets is arranged in a grid pattern with every third column of cuplets being at least partially filled with the PL material (indicated by a left diagonal fill pattern). Further, the two columns in between each third column may be filled with a material (indicated by a blank fill pattern) other than the PL material, such as a material with a high index of refraction ("high index material") dispersed in a second material with low index of refraction. Such a mixture, properly chosen can match the directional scattering that will be caused by the PL material, but without wavelength conversion. Wavelength conversion is not necessary for the red and blue colors. Examples of such materials include, but are not limited to, titanium dioxide dispersed in a polymer. In this grid configuration, violet light may be selectively directed to one or more cuplets at least partially filled with the PL material to produce green light, while red and blue light may be selectively directed to one or more cuplets that are at least partially filled with the material other than the PL material (e.g., the high index material dispersed in a low index material).

It will be appreciated that the cuplets may be arranged in any suitable pattern to facilitate image formation. Further, it will be appreciated that any suitable pattern of cuplets may be at least partially filled with the PL material to facilitate image formation. For example, in some embodiments, the high index material mixed with low index material (or other non-PL material) may be omitted as a fill material. Further, in other embodiments, one or more cuplets may be partially filled with the PL material and partially filled with the material other than the PL material. Further still, it will be appreciated that different cuplets may be filled with various different PL materials may be configured to generate different colors.

In addition to producing green light in a more cost-effective manner than via a green laser diode, the use of the PL material, may also help to avoid laser speckle, as any PL material will absorb coherent light and emit incoherent light, thereby helping to improve projected image quality. As described herein, this will only benefit the green light, but since most images are a mixture of red, green and blue light, speckle will be substantially be reduced in most images.

In some embodiments, a background surface 314 of display screen 304 (i.e. the viewing surface not occupied by cuplets) may be configured to absorb ambient light in order to provide a high contrast to light emitted from the cuplets. For example, in one particular embodiment, the cuplet microstructure may occupy five percent of display screen 304, while background surface 314 may occupy the remaining ninety five percent of display screen 304. The absorption of ambient light by the background surface helps to reduce an amount of ambient light reflected by the background surface 314, and therefore may help to improve image contrast. The background surface 314 may be configured to absorb ambient light via any suitable structures. For example, in some embodiments, an ambient light absorbing material, such as a black pigment or dye, may be applied to viewing surface 314. In other embodiments, a roughness of viewing surface 314 may be increased to modify ambient reflection properties.

Likewise, in some embodiments, an ornamental design may be applied to viewing surface 314 such that the ornamental design is only perceived when light is not directed to the light input opening of one or more selected cuplets that would generate an image on display screen 304. In such embodiments, the light source may be suitably powerful enough to provide light, that when emitted from the cuplet microstructure, with a significantly greater brightness than light reflected by the ornamental design so that only the projected image is perceived.

Figure 4:
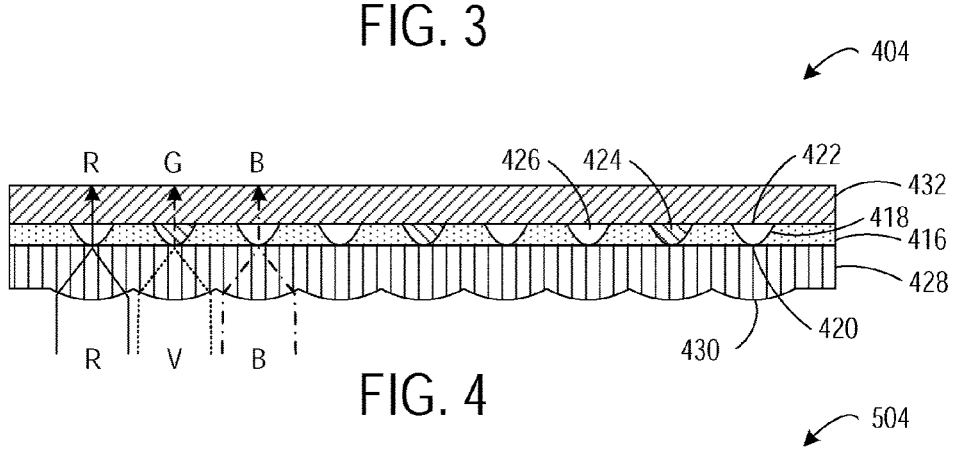
FIG. 4 is a sectional view of an embodiment of the display screen comprising a cuplet microstructure.

FIG. 4 shows a sectional view of an embodiment of a display screen 404. It will be understood that display screen 304 may have a similar or different cross-sectional structure than the display screen 404. The display screen 404 comprises a cuplet microstructure sheet 416 (indicated by a dotted fill pattern) that includes a plurality of cuplets, one of which is shown at 418. The cuplet microstructure sheet may be formed from a reflective material such that each cuplet has a reflective interior surface. For example, in some embodiments, the cuplet microstructure sheet may be formed from stainless steel. Each cuplet 418 may include a light input opening 420 (e.g. a small hole in the cuplet bottom) and a light output opening 422. Each cuplet 418 may have a shape configured to reflect light toward light output opening 422, such as a spherical, parabolic, or other suitable shape.

A PL material 424 may at least partially fill one or more cuplets 418 of the plurality of cuplets. As discussed above, the PL material 424 may be configured to absorb violet light and emit green light to enable the production of green light via a violet laser diode source. Further, the reflective surfaces and shape of the cuplets may redirect light emitted by the PL material 424 out of the cuplet to increase an amount of light emitted from the PL material that reaches a viewer. Further, in some cases the PL material may be configured to absorb red and blue ambient light to improve image contrast. It will be appreciated that the PL material may be placed in the cuplets in any suitable manner. For example, the PL material may be deposited in the selected cuplet using inkjet technology. As another example, the PL material may be deposited in the selected cuplet using a silk screening process, or other suitable printing process.

As mentioned above, a material 426 other than PL material 424, such as a high index material dispersed in a low index material, may at least partially fill one or more cuplets 418 of the plurality of cuplets. It will be appreciated that the material 426 may be placed in a selected cuplet in virtually any suitable manner. For example, the material may be deposited in the selected cuplet using inkjet technology. As another example, the material 426 may be deposited in the selected cuplet using a silk screening process, or other suitable printing process.

Continuing with FIG. 4, in some embodiments, a lens sheet 428 (indicated by a vertical line fill pattern) may be used in conjunction with cuplet microstructure sheet 416 to focus light into the light input openings 420 of the cuplets. In one particular embodiment, the lens sheet may be bonded to the cuplet microstructure sheet. The lens sheet 428 may comprise a plurality of lenslets or small lens structures (each lenslet representative of lenslet 430). Each lenslet 430 may be optically aligned with a corresponding cuplet 418 of the plurality of cuplets such that each lenslet directs light to light input opening 420 of a corresponding cuplet 418.

In some embodiments, a view filter sheet 432 (indicated by a right diagonal line fill pattern) may be secured to cuplet microstructure sheet 416 such that light output opening 422 of each cuplet 418 interfaces with view filter sheet 432. In one particular embodiment, view filter sheet 432 may be bonded to the cuplet microstructure sheet. View filter sheet 432 may be configured to prevent physical damage to cuplet microstructure sheet 416. Another function of the view filter is to prevent low visibility excitation light from reaching the viewer, since such light is not intended to be part of the perceived image. In some embodiments, view filter sheet 432 may be formed from a transparent plastic material. In other embodiments, view filter sheet 432 may comprise a wavelength selective coating. For example, the wavelength selective coating may comprise a dichroic mirror that reflects light of a selected frequency. Accordingly, such light may be reflected back to the cuplet where it may be again reflected to interact with the PL material and be emitted by the PL material. Such a configuration may improve the light output efficiency of the display screen. Further, in some embodiments, view filter sheet 432 may comprise a circular polarizer film that may be configured to polarize ambient light so that it is circularly polarized when it impinges on viewing surface 314. Such light, when reflected will have opposite handedness, and will be absorbed by the circular polarizer, thus reducing ambient reflectance. Such a configuration may reduce light intensity, but also may improve contrast. In some embodiments, cuplet microstructure sheet 416 may comprise a high contrast coating proximate to the plurality of cuplets. For example, an ambient light absorbing material may be applied to a viewing surface of the cuplet microstructure sheet. In particular, the ambient light absorbing material may surround each cuplet. In some cases, the ambient light absorbing material may cover the viewing surface of the cuplet microstructure sheet other than where the plurality of cuplets is disposed. In some embodiments, the viewing surface of the cuplet microstructure sheet may be contoured to absorb ambient light in order to provide a high contrast.

In the illustrated embodiment, a red light beam (indicated by a solid line) is directed to a lenslet (for example, via a light guide or other suitable light delivery system) that is registered to a corresponding cuplet that is filled with material that emits red light. The lenslet may be positioned to focus the red light beam to a light input opening of the corresponding cuplet. The red light travels through the material and is emitted from the light output opening of the cuplet. A violet light beam (indicated by a dotted line) is directed to a lenslet that is registered to a corresponding cuplet filled with the PL material. The lenslet may be positioned to focus the violet light beam to a light input opening of the corresponding cuplet. The light beam may be absorbed by the PL material, which in response emits green light (indicated by a dot-dashed line) through the light output opening of the cuplet. A blue light beam (indicated by a dashed line) is directed to a lenslet that is registered to a corresponding cuplet that is filled with material that emits blue light. The lenslet may be positioned to focus the blue light beam to a light input opening of the corresponding cuplet. The blue light travels through the material and is emitted from the light output opening of the cuplet. In this manner, the display screen 404 converts an input of red/violet/blue light to an output of red/green/blue light.

Figure 5:
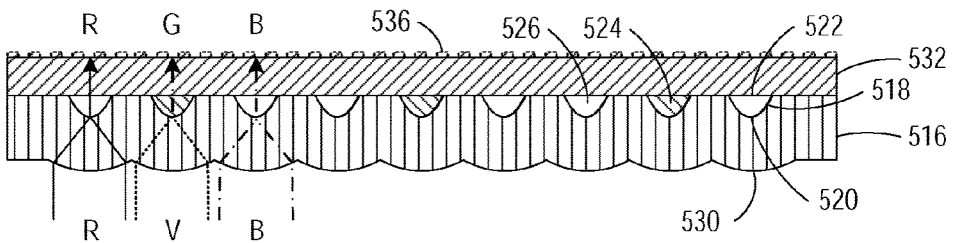
FIG. 5 is a sectional view of another embodiment of a display screen comprising a cuplet microstructure.

FIG. 5 shows a sectional view of another embodiment of a display screen 504. It will be understood that display screen 304 may have a similar or different cross-sectional structure than the display screen 504. The display screen 504 may comprise a cuplet microstructure sheet 516 (indicated by a vertical line fill pattern) that may comprise a plurality of cuplets, one of which is indicated at 518. Further, cuplet microstructure sheet 516 may comprise a plurality of lenslets 530, such that the cuplets 518 and lenslets 530 are formed in a same sheet of material. Each lenslet 530 of the plurality of lenslets may correspond to a corresponding cuplet 518 of the plurality of cuplets.

In some embodiments, cuplet microstructure sheet 516 may be molded to form the plurality of cuplets and the plurality of lenslets such that each of the plurality of lenslets is optically registered to a corresponding cuplet. In such embodiments, a reflective material 534 may be applied to a cavity of each cuplet to create a reflective surface in each cuplet and a light input opening 520 (such as a small hole) may be formed in the reflective material. Further, a PL material 524 may be deposited in one or more cuplets and a material 526 other than the PL material may be deposited in one or more cuplets.

In some embodiments, cuplet microstructure sheet 516 may be molded to form the plurality of cuplets and the plurality of lenslets such that each of the plurality of lenslets is optically registered to a corresponding cuplet. In such embodiments, sheet 516 may be formed of a material that transmits the excitation light and absorbs visible light. Further, a PL material 524 may be deposited in one or more cuplets and a material 526 other than the PL material may be deposited in one or more cuplets. In one embodiment of such a configuration red or blue excitation light may not be used and PL material may be excited by shorter than visible wavelengths of light.

A view filter sheet 532 (indicated by a right diagonal line fill pattern) may be secured to cuplet microstructure sheet 516 such that light output opening 522 of each cuplet 518 interfaces with view filter sheet 532. In one particular embodiment, the view filter sheet may be bonded to the cuplet microstructure sheet. The view filter sheet 532 may be configured to prevent physical damage to cuplet microstructure sheet 516. In some embodiments, view filter sheet 532 may be formed from a transparent plastic material. Further, in some embodiments, view filter sheet 532 may comprise a wavelength selective coating. For example, the wavelength selective coating may comprise a dichroic mirror that reflects light of a selected excitation frequency. Accordingly, such light may be reflected back to the cuplet where it may be again reflected to interact with the PL material and be emitted by the PL material. Such a configuration may improve the light output efficiency of the display screen. Additionally, in some embodiments, view filter sheet 532 may comprise a circular polarizer film that may be configured to polarize ambient light so that it is circularly polarized when it impinges on viewing surface 314. Such light, when reflected will have opposite handedness, and will be absorbed by the circular polarizer, thus reducing ambient reflectance. Such a configuration may reduce light intensity but may improve contrast. Further, in some embodiments, a surface of view filter sheet 532 may comprise contouring 536 that may be configured to absorb ambient light.

Figures 6, 7:
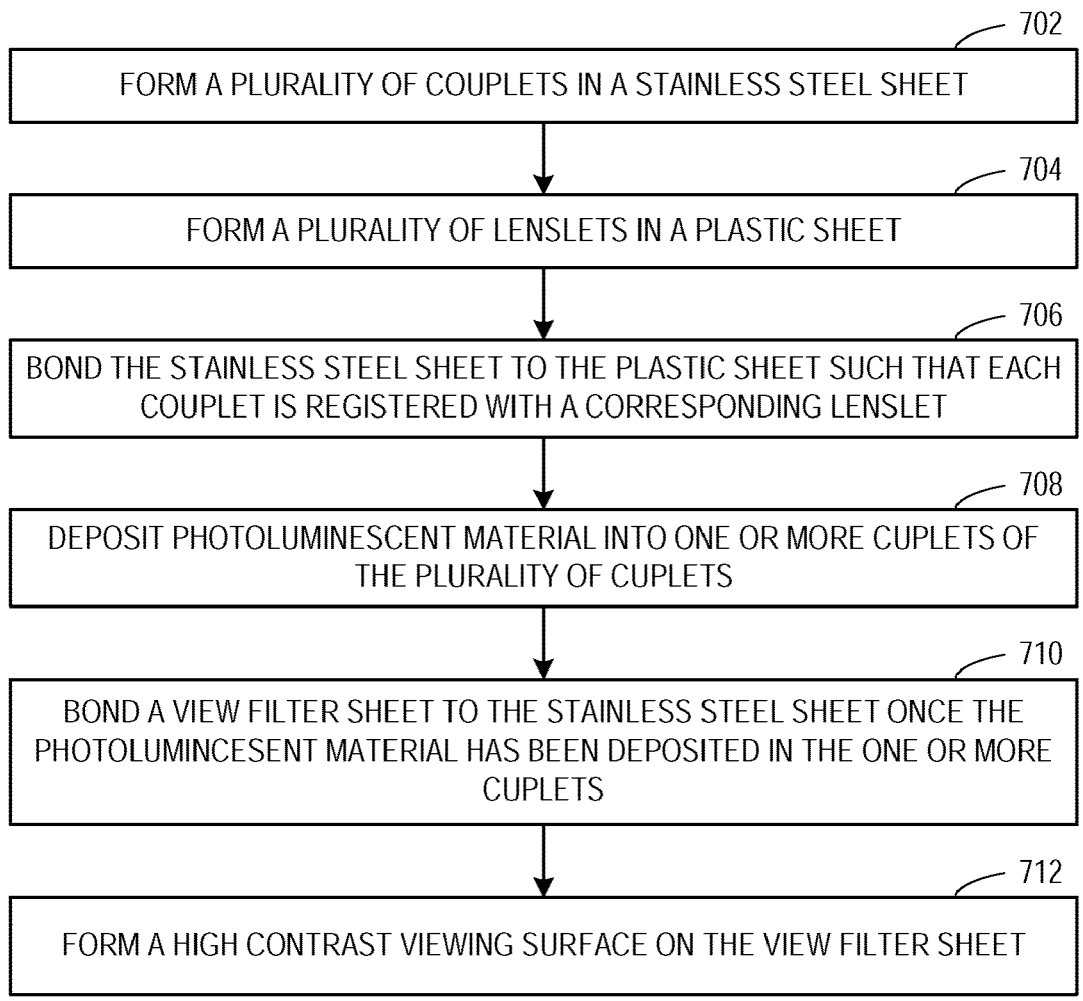
FIG. 6 is a sectional view of an embodiment of a cuplet.
FIG. 7 is a flow diagram of an embodiment of a method for manufacturing a display screen comprising a cuplet microstructure.

FIG. 6 schematically shows a sectional view of an embodiment of a cuplet 618. The cuplet 618 may form a light input opening 620 and a light output opening 622. The light output opening may have a diameter 636 that may be larger than a diameter 638 of light input opening 620. The smaller light input opening and the larger light output opening, in combination with the reflective inner surface of the cuplet 618, may help to increase an amount of light emitted by the PL material and/or scattered by a mixture of high index material and low index material that is directed out of the light output opening compared to the light input opening.

The light input opening 620 and the light output opening 622 may have any suitable diameters. For example, in some embodiments, the light input opening 620 may have a diameter in a range of 30 to 55 microns, and the light output opening may have a diameter in a range of 180 to 90 microns. In one more specific embodiment, the light input opening may have a diameter of three microns and the light output opening may have a diameter of ten microns. In another specific embodiment, the light input opening may have a diameter of five microns and the light output opening may have a diameter of eighty microns. In this example, the cuplet microstructure sheet that forms the cuplet may have a thickness of eighty fifty microns. It will be appreciated that, the light input opening and light output opening of a cuplet may be sized to accommodate the area of a cone of light directed to the cuplet, a desired pixel size for the display, etc. The light cone area may be sized based on any number of contributing factors including the configuration of the lens sheet, light delivery system, and/or light source. For example, in a low cost system, the size of the cuplets may be increased to accommodate an inexpensive laser beam projection device that has a large beam width.

As described above, the cuplet 618 may be at least partially filled with a PL material 624. In some embodiments, PL material 624 may be layered with material 626 (e.g., transparent material) other than the PL material. The material 626 may be deposited at the base of the cuplet to allow incident light to enter cuplet 618 via light input opening 620. Further, in some embodiments, a small amount of material 626 may be used so that when scattered, a smaller fraction of light will be lost going back through light input opening 620. In some embodiments, the cuplet 618 may be only partially filled (e.g., not full) with material (e.g., PL material, high/low index material, etc.) so that the material does not interface or make optical contact with the view filter sheet when the view filter sheet is secured to the cuplet microstructure sheet. This may reduce or prevent generation of guided rays of light within the view filter sheet.

As discussed above, in some embodiments the PL material may be configured to generate green display light from a violet laser light source. However, it will be appreciated that virtually any suitable PL material, combination of different PL materials, and/or fill pattern may be used to generate a desired color scheme using one or more light sources. For example, some of the cuplets could be filled with green PL material, others with red PL material, and still others with blue PL material. Some PL materials can be excited over a broad range of wavelengths if those wavelengths are shorter than or equal to the emission wavelength (quantum dots are an example of such a material). Thus, it may be possible to use a single wavelength excitation source in the range of 380 nanometers to 440 nanometers to excite all three materials and thus generate red, green and blue light for the viewer. The patterning of the excitation light would have to be done with knowledge of the patterning of the PL materials, so as to generate the desired image. Further, if the RGB PL material is finely interleaved, and the V excitation light can be finely controlled (such as with laser scanned beam) then arbitrary colored images can be generated by controlling the illumination pattern. If the V illumination can only be controlled in coarse patterns, then the effect can be to turn on or off RGB patterns that fall entirely within a block, or a few adjacent blocks. In such a configuration, different color images may be generated by controlling a single scanned beam laser device to illuminate selected RGB regions of a display screen. Moreover, in such a configuration since only one type of excitation source (e.g., one laser) may be used to generate color images, reductions in cost may be achieved.

FIG. 7 shows a flow diagram of an embodiment of a method 700 for manufacturing a display screen. As discussed above, the display screen may be used in a user interface device such as a display device or an interactive keyboard, or in any other suitable projection display use environment. The display screen may comprise a plurality of cuplets that may be at least partially filled with PL material that may be configured to convert the color of light traveling through the PL material during image formation on the display screen. Additionally, the PL material may emit incoherent light which may reduce or eliminate speckle effects of images displayed on the display screen.

The method begins at 702 by forming a plurality of cuplets in a stainless steel sheet. In one embodiment, the plurality of cuplets may be formed in the stainless steel sheet by applying a resist pattern that maps the position of the plurality of cuplets onto the stainless steel sheet. Subsequently, the stainless steel sheet may be placed in a wet chemical bath to etch the cuplets into the stainless steel sheet. It will be appreciated that reflective materials other than stainless steel may be use to form the cuplet microstructure.

At 704, the method comprises forming a plurality of lenslets in a plastic sheet. The surface of the plastic sheet opposite the lenslets may be made smooth to reduce optical interference between layers of the display screen. In some embodiments, the plastic sheet may be molded to form the plurality of lenslets.

At 706, the method comprises bonding the stainless steel sheet to the plastic lenslet sheet that comprises the plurality of lenslets. The bonding may be performed such that each cuplet of the plurality of cuplets is registered to a corresponding lenslet of the plurality of lenslets. In some embodiments, a back surface of the display screen may carry registration markings that can cause coupling of light to a photo detector. This photo signal detector may be used to learn fine position of the cuplet microstructure alignment so that the proper image information can be overlaid on the structure despite imperfections and variations.

At 708, the method comprises depositing PL material into one or more cuplets of the plurality of cuplets formed in the stainless steel sheet. In some embodiments, the photoluminescent material may be deposited using inkjet technology. By using inkjet technology to deposit PL material, fill patterns may be flexibility changed at the time of manufacture to accommodate specific applications by changing a data file that controls the inkjet application. In other words, any given pattern of cuplet microstructure may be filled by changing a data file that dictates the pattern. This simple and flexible control may facilitate manufacture of many different types of display screens for different applications without extensive retooling or changes in manufacturing configurations. In other embodiments, the PL material may be deposited using silk screening, or any other suitable process.

At 710, the method may comprise bonding a view filter sheet to the stainless steel sheet once the photoluminescent material has been deposited in the one or more cuplets of the plurality of cuplets. The view filter sheet act as a protective layer that may reduce or prevent physical damage to the cuplet sheet. At 712, the method may comprise forming a high contrast viewing surface on the view filter sheet. The high contrast viewing surface may reduce the reflection of ambient light, while still providing efficient transmission of light from the plurality of cuplets.

In some embodiments, forming the high contrast surface may comprise applying a light absorbing material to a surface of the view filter sheet. The absorbing material may be applied in a uniform manner for simplicity. Although, it will be appreciated that the absorbing material could also be applied in a patterned manner, with holes in the pattern matching the location of cuplets after assembly. Further, in some embodiments, forming the high contrast viewing surface may comprise applying an ambient light absorbing material to an area of a surface of the stainless steel sheet surrounding the plurality of cuplets. In some cases, the view filter sheet may be formed from transparent plastic material so that ambient light passes through the view filter sheet to the ambient light absorbing materiel on the stainless steel sheet. In such embodiments, forming the high contrast viewing surface may comprise contouring a surface of the view filter, wherein the contouring is configured to absorb ambient light. Further, in some embodiments, a wavelength selective material may be applied to the view filter sheet to form the high contrast surface.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A user interface device comprising:
a cuplet microstructure sheet comprising a plurality of cuplets, each cuplet forming a light input opening and a light output opening, a light output opening diameter being larger than a light input opening diameter;
a photoluminescent material at least partially filling one or more cuplets of the plurality of cuplets; and
a light source configured to generate light that is directed to the light input opening of one or more selected cuplets of the plurality of cuplets.

2. The user interface device of claim 1, further comprising:
a lens sheet secured to the cuplet microstructure sheet, the lens sheet comprising a plurality of lenslets, each lenslet being optically aligned with a corresponding cuplet of the plurality of cuplets such that each lenslet directs light to the light input opening of a corresponding cuplet.

3. The user interface device of claim 1, wherein the cuplet microstructure sheet is formed from stainless steel.

4. The user interface device of claim 1, wherein the cuplet microstructure sheet comprises a plurality of lenslets, each lenslet of the plurality of lenslets corresponding to a cuplet of the plurality of cuplets.

5. The user interface device of claim 4, wherein a surface of each cuplet comprises a reflective material.

6. The user interface device of claim 1, further comprising:
a light guide positioned optically between the light source and the cuplet microstructure sheet, the light guide being configured to deliver light produced by the light source to the light input opening of one or more cuplets of the plurality of cuplets.

7. The user interface device of claim 1, wherein the light source comprises a scanned beam laser projection device configured to produce light having a wavelength in a range between 380-495 nanometers, and wherein the photoluminescent material is configured to absorb light produced by the scanned beam laser projection device and emit light having a wavelength in a range between 495-570 nanometers.

8. The user interface device of claim 1, further comprising:
a view filter sheet secured to the cuplet microstructure sheet such that the light output opening of each cuplet interfaces with the view filter sheet.

9. The user interface device of claim 8, wherein the view filter sheet comprises a high contrast viewing surface that comprises one or more of a wavelength selective coating and a circular polarizer film.

10. The user interface device of claim 9, wherein the high contrast surface comprises a design that is only perceived when the light is not directed to the light input opening of one or more selected cuplets of the plurality of cuplets.

11. The user interface device of claim 1, wherein the photoluminescent material only partially fills the one or more cuplets of the plurality of cuplets.

12. A user interface device comprising:
a keypad comprising a plurality of keys, each key of the plurality of keys comprising a cuplet microstructure sheet comprising a plurality of cuplets, each cuplet forming a light input opening and a light output opening, the light output opening having a larger diameter than the light input opening;
a photoluminescent material at least partially filling one or more cuplets of the plurality of cuplets;
a lens sheet secured to the cuplet microstructure sheet, the lens sheet comprising a plurality of lenslets, each lenslet being optically aligned with a corresponding cuplet of the plurality of cuplets such that each lenslet directs light to the light input opening of a corresponding cuplet; and
a scanned beam laser projection device configured to generate light to illuminate one or more selected cuplets of the plurality of cuplets, the light being directed to the light input opening of one or more cuplets via one or more corresponding lenslets, and wherein the photoluminescent material is configured to absorb light produced by the scanned beam laser projection device and emit light having a wavelength in a range between 495-570 nanometers.

13. The user interface device of claim 12, further comprising:
a view filter sheet comprising a high contrast viewing surface and secured to the cuplet microstructure sheet such that the light output opening of each cuplet interfaces with the view filter sheet.

14. The user interface device of claim 12, wherein one or more cuplets of the plurality of cuplets is at least partially filled with a high index material mixed with a low index material and not the photoluminescent material.

15. The user interface device of claim 14, wherein light having a wavelength in a range of 440-495 nanometers and/or 620-750 nanometers is selectively directed to the one or more cuplets that is at least partially filled with the high index material mixed with the low index material, and light having a wavelength of 400-440 nanometers is selectively directed to the one or more cuplets at least partially filled with photoluminescent material.

16. A method for manufacturing a display screen comprising:
   forming a plurality of cuplets in a cuplet microstructure sheet, each cuplet forming a light input opening and a light output opening, a light output opening diameter being larger than a light input opening diameter;
   bonding the cuplet microstructure sheet to a lenslet sheet comprising a plurality of lenslets, such that each cuplet of the plurality of cuplets is registered to a corresponding lenslet of the plurality of lenslets;
   depositing photoluminescent material into one or more cuplets of the plurality of cuplets; and
   bonding a view filter sheet to the microstructure sheet once the photoluminescent material has been deposited in the one or more cuplets of the plurality of cuplets.

17. The method of claim 16, further comprising:
   forming a high-contrast viewing surface on the view filter sheet.

18. The method of claim 17, wherein forming comprises applying an ambient light absorbing material to an area of a surface of the stainless steel sheet surrounding the plurality of cuplets.

19. The method of claim 17, wherein forming comprises contouring a surface of the view filter, the contouring being configured to absorb ambient light.

20. The method of claim 16, wherein the photoluminescent material is deposited using inkjet technology.

* * * * *